C. HOLLY.
DIGGING MACHINE.
APPLICATION FILED SEPT. 20, 1920.
1,373,815.
Patented Apr. 5, 1921.
3 SHEETS—SHEET 1.
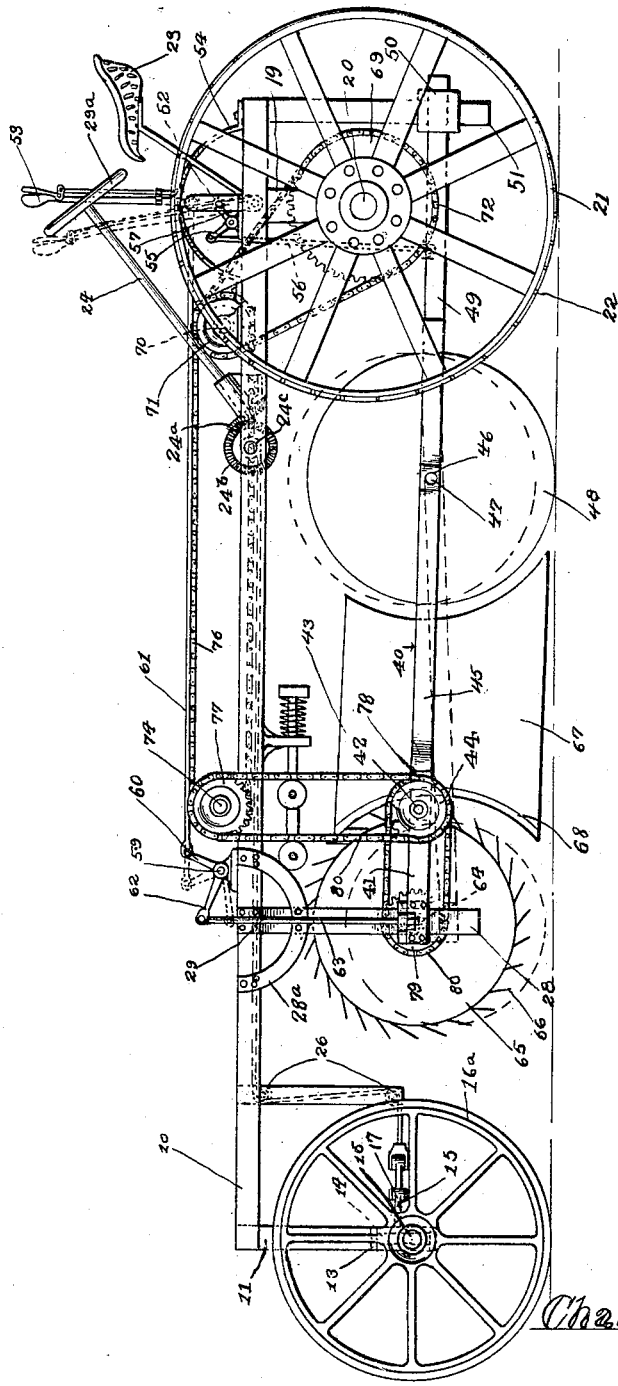
Inventor
Charles Holly.
By Watson E. Coleman
Attorney

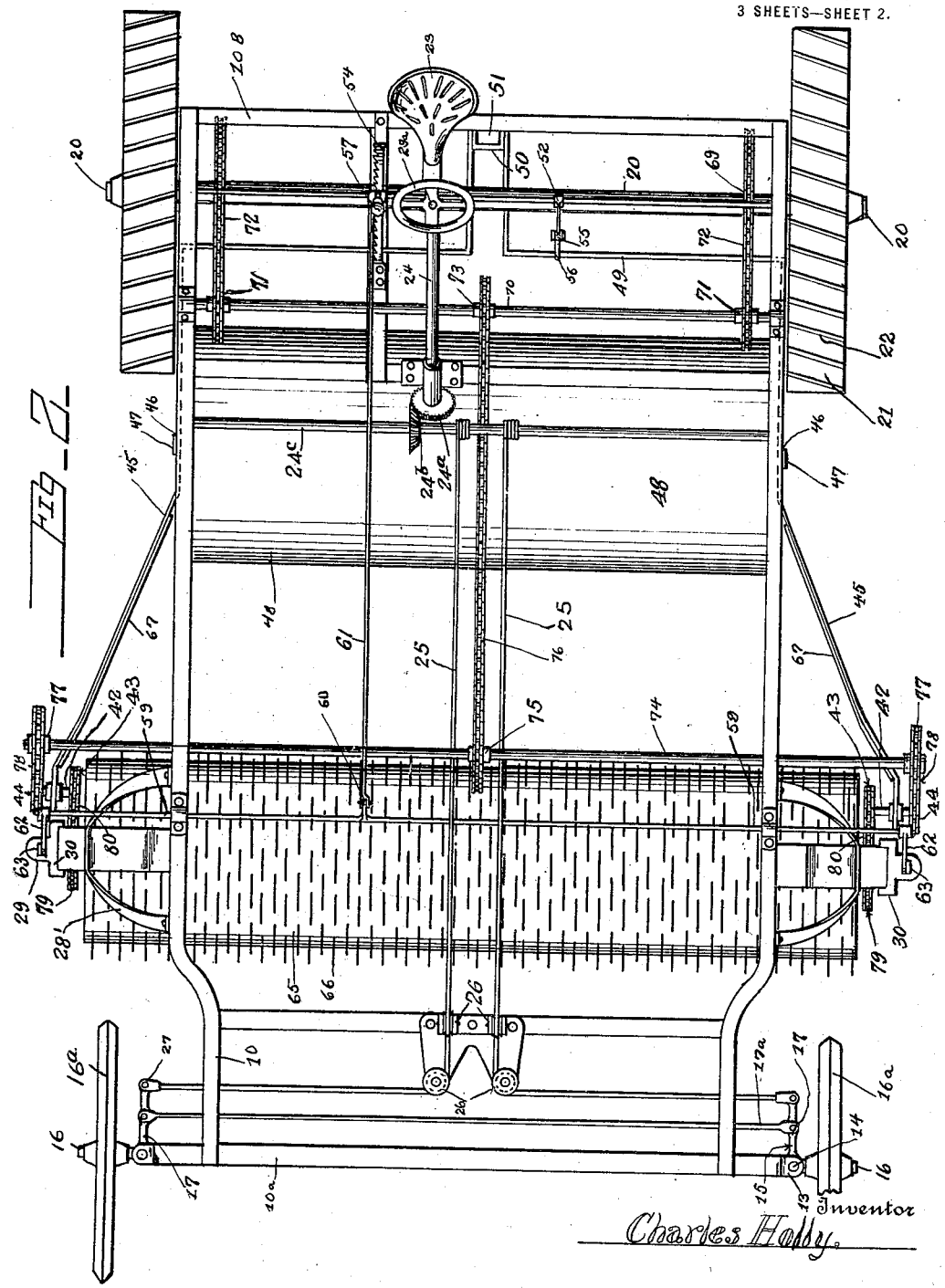

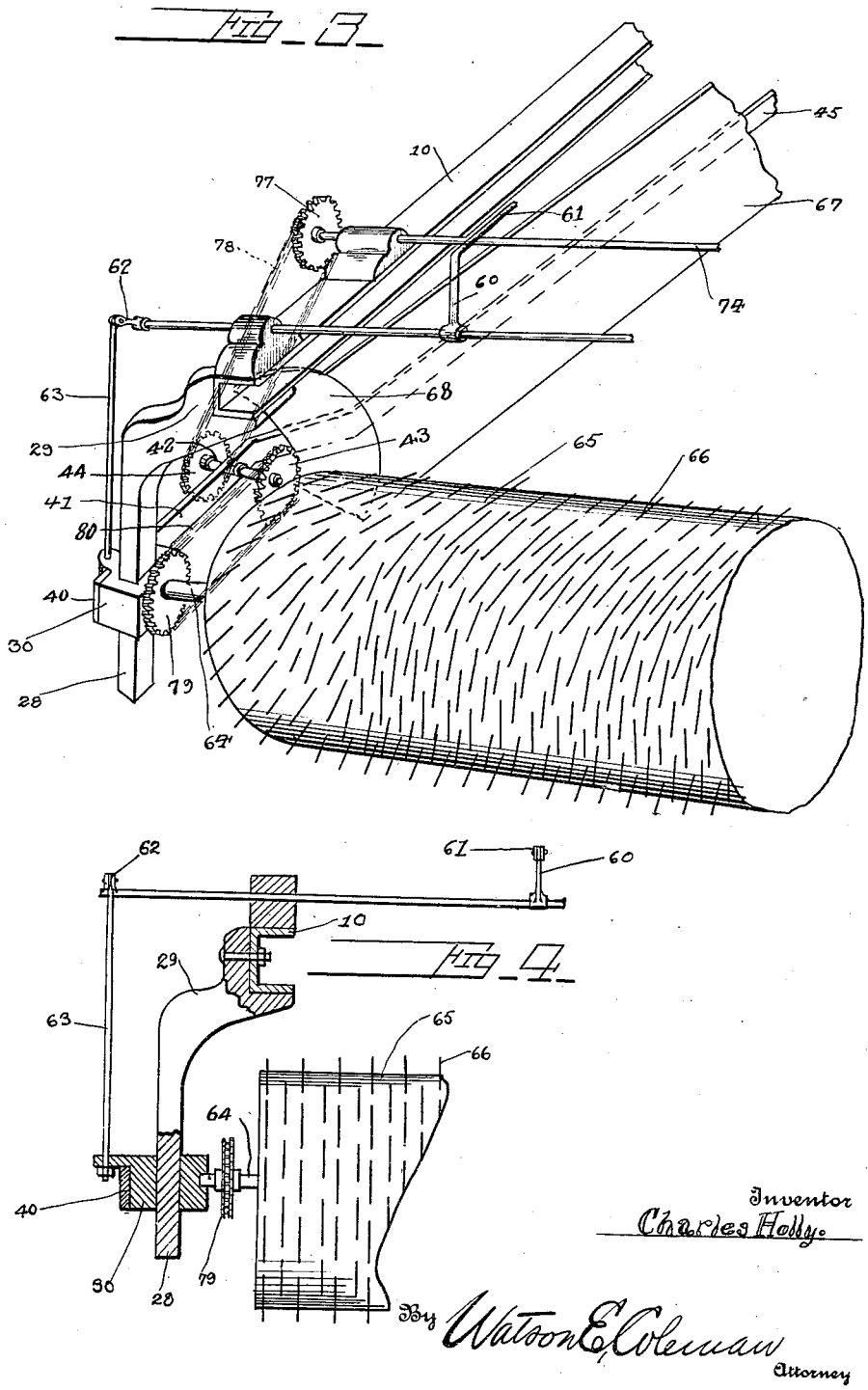

UNITED STATES PATENT OFFICE.

CHARLES HOLLY, OF WEIMAR, TEXAS.

DIGGING-MACHINE.

1,373,815.   Specification of Letters Patent.   Patented Apr. 5, 1921.

Application filed September 20, 1920. Serial No. 411,369.

*To all whom it may concern:*

Be it known that I, CHARLES HOLLY, a citizen of the United States, residing at Weimar, in the county of Colorado and State of Texas, have invented certain new and useful Improvements in Digging-Machines, of which the following is a specification, reference being had to the accompanying drawings.

This invention relates to improvements in digging machines, and has for an important object the provision of a digging machine particularly adapted for use in breaking hard soil, such as the surface of prairies and the like.

A further object of the invention is to provide a machine of this character which, in addition to breaking the soil, will form the same into ridges and compress the dirt of the ridges sufficiently to prevent dispersal thereof by ordinary rains and wind.

Other objects and advantages of the invention will become apparent throughout the course of the following description.

In the accompanying drawings, wherein for the purpose of illustration is shown a preferred embodiment of my invention, and wherein like reference characters designate like parts throughout:

Figure 1 is a side elevation of a machine constructed in accordance with my invention, Fig. 2 is a plan view thereof, Fig. 3 is a fragmentary perspective showing the mounting of the cutting drum, and Fig. 4 is a detail sectional view thereof.

Referring now more particularly to the drawings, a frame is employed comprising side bars 10 and front and rear end bars $10^a$ and $10^b$, respectively. Extending downwardly from the front bar $10^a$ are frame supporting members 11 which are connected at their lower ends with an axle 13. This axle has mounted in its opposite ends vertical king bolts 14, upon which are rotatably mounted bell cranks 15 embodying transverse arms 16 forming supports for rotatable steering wheels $16^a$ and longitudinal arms 17 having connected thereto intermediate their ends a rigid link $17^a$ which assures simultaneous and uniform action of the bell cranks and of the steering wheels $16^a$. The rear end of the frame 10 has extending downwardly therefrom adjacent the ends thereof supporting members 19 having mounted therein an axle 20 on the ends of which are mounted rear supporting wheels 21 provided with ground engaging lugs 22.

The frame has mounted thereon rearwardly thereof a driver's seat 23. Arranged adjacent to the driver's seat is a steering wheel $23^a$ embodying the usual steering shaft 24. To the lower end of the steering shaft 24 is secured a beveled gear $24^a$ which meshes with the similar beveled gear $24^b$ carried by the shaft $24^c$ rotatably mounted upon the frame 10. The shaft $23^c$ has oppositely wound thereon flexible elements 25 which pass about a series of pulleys 26 and have their ends secured to the ends of the arms 17 of the bell crank levers 15, thereby providing adjacent the driver's seat means for controlling the action of the steering wheels.

Arranged forwardly of the device are vertical guiding arms 28, suitably braced as at $28^a$, and provided at their upper ends with inwardly extending portions 29 secured to the side bars 10 of the frame. The vertical guide members form slideways for vertically shiftable members or yokes 30. Secured to these yokes 30 are longitudinally extending bars 40, provided forwardly with portions 41 paralleling the frame. These portions 41 have each mounted thereon a stub shaft 42 having secured thereto sprocket wheels 43 and 44. Rearwardly of the stub shaft 42, the bars 40 are provided with an inset terminating in a rearwardly extending angular portion 45 causing the bars, at these sections to converge. At the rear ends of the angular portions 45 the bars again parallel the frame and are provided in these parallel portions with openings 46 adapted for the reception of the axle 47 of a roller 48. Rearwardly of the roller the bars are inbent, as at 49, and have secured to the ends thereof a slide 50. Secured to the frame is a downwardly extending guide 51 upon which the slide 50 operates.

Mounted upon the frame rearwardly thereof and adjacent the driver's seat 23, is a transverse rock shaft 52, having secured thereto an operating handle 53 which coacts with a segmental rack 54. This rock shaft has secured thereto a normally horizontally disposed arm 55 connected by a link 56 with the inbent ends 49. Mounted upon the side bars 10 of the frame and extending transversely of the frame above the guide arms 28 is a rock shaft 59 having a normally vertically disposed arm 60 secured thereto, which is connected by means of link 61 to the normally vertically disposed arm 57 of the rock shaft 52. The shaft 59 has secured to its ends normally horizontally disposed arms 62, which are connected by means of links 63 with the yokes 30 operating upon the guide arms 28. It will be seen that when desired the yokes 30 and 50 may be simultaneously vertically adjusted and locked in such adjusted position. For a purpose hereinafter to appear, the link 56 connecting the arm 55 of the rock shaft 52 with the slide 50 is made of some flexible material, such as cable or the like. In fact, each of the arms of each of the shafts may be connected with its coacting member by a flexible connection if desired.

A shaft 64 is provided having its ends rotatably mounted in the slides 30. This shaft has secured thereto a drum 65 of any desired construction embodying a plurality of shares or digging teeth 66. Secured to the converging portions of the arm 40 are vertically disposed guides 67 having their ends curved to correspond, at the forward end of the guide to the curvature of the drum and at the rear end of the guide to the curvature of the roller 48. The forward ends of the guides are provided with transversely extending portions 68 extending upwardly and secured to the guides and to the inbent portions of the bars 40 rearwardly of the stub shaft 42.

Secured to the shaft 20 adjacent each end thereof is a sprocket gear 69 of relatively large size. Rotatably mounted upon the frame adjacent the rear end thereof is a transverse shaft 70 provided upon its ends with relatively small wheels 71 connected with the sprocket wheels 69 by means of chains 72. The shaft 70 is likewise provided intermediate such ends with a sprocket wheel 73. Rotatably mounted upon the side bars of the frame, preferably slightly rearwardly of the rock shaft 59, is a shaft 74 provided with a sprocket wheel 75 alined with the sprocket wheel 73 of the shaft 70 and connected therewith by a chain 76. The shaft 74 is provided upon its ends with sprocket wheels 77, each connected by a chain 78 with the sprocket wheel 44 of the stub shaft 42 of the corresponding side bar 40. Mounted upon the shaft 64 intermediate the ends of the drum and the guides 30 are sprocket wheels 79 connected by chain 80 with the sprocket wheels 43 of the stub shaft 42. It will be seen that when the device is moved along the ground the drum 65 will be driven from the rear wheels 21 and at a higher rate of speed than such rear wheels.

In the operation of my device the same may be moved along the ground either by means of power carried by the frame or may be drawn by a tractor or corresponding device. As the device moves over the ground the drum 65 is rotated, causing the shares 66 thereof to engage the ground with a hoe-like action. The dirt is thrown rearwardly from the drum by these teeth or shares 66 intermediate the guard plates 67, which as they converge, cause the earth to be piled in a space narrower than the width of the cut formed by the drum. The roller passes over the piled dirt compressing the same, forming a ridge provided at each side with a depression or ditch. Attention is particularly directed to the fact that the cutting drum is of greater width than the transverse space intermediate the pairs of supporting wheels, more commonly designated as the wheel span, whereby permitting joining of the edge of a new cut to the edge of a previous cut and at the same time permitting the device to remain as level as the ground upon which the cut is being taken. The roller is of less width than the wheel span and as the guards converge to this roller a ridge of dirt is formed having upon each side thereof a ditch or furrow in which the rear wheels operate. It will be obvious that the lugs of these wheels are therefore constantly in engagement with firm hard ground thus assuring an even drive for the digging drum.

As many changes are possible in the shape, size and general construction of various portions of my device, as hereinbefore set forth, I do not limit myself to the specific construction hereinbefore set forth, except as so limited by the subjoined claims.

Having now described my invention, what I claim is:

1. In a digging machine, a wheel supported frame, a rotatable digging drum mounted transversely of said frame forwardly thereof, a transverse roller carried by said frame rearwardly of said digging drum and of less width than said drum and means for directing the earth excavated by said digging drum beneath said roller.

2. In a digging machine, a wheel supported frame, a rotatable digging drum mounted transversely of said frame forwardly thereof, a transverse roller carried by said frame rearwardly of said digging drum and of less width than said drum, means for directing the earth excavated by said digging drum beneath said roller, and means for simultaneously vertically adjusting said digging drum and roller.

3. In a digging machine a wheel supported frame, means carried by said frame for digging a strip of earth of a width greater than the span of the supporting wheels of the frame to a predetermined depth and means for forming the dug earth in a ridge of less width than the span of the supporting wheels.

4. In a digging machine, a wheel supported frame, means carried by said frame for digging a strip of earth of a width greater than the span of the supporting wheels of the frame embodying a rotatable drum provided upon its periphery with a plurality of digging teeth, means for forming the dug earth in a ridge of less span than the supporting wheels, and means for compressing the earth of the formed ridge.

5. In a digging machine, a wheel supported frame embodying spaced side bars, depending guides secured to said side bars and spaced apart a distance greater than the distance between such said side bars, slides vertically adjustably mounted upon said guides, a drum rotatably mounted within said slides, and means connecting certain of said supporting wheels and said drum whereby the drum is rotated at a higher rate of speed than said wheels by movement of the machine in one direction.

In testimony whereof I hereunto affix my signature.

CHARLES HOLLY.